United States Patent [19]

Makowski et al.

[11] 4,221,712
[45] Sep. 9, 1980

[54] PROCESS FOR FORMING A METAL SULFONATE CONTAINING EPDM

[75] Inventors: Henry S. Makowski, Scotch Plains; Jan Bock; Robert D. Lundberg, both of Bridgewater, all of N.J.

[73] Assignee: Exxon Research & Engineering Co., Florham Park, N.J.

[21] Appl. No.: 22,976

[22] Filed: Mar. 23, 1979

Related U.S. Application Data

[63] Continuation-in-part of Ser. No. 9,871, Feb. 7, 1979, abandoned, which is a continuation of Ser. No. 855,762, Nov. 29, 1977, abandoned.

[51] Int. Cl.$^2$ .............................................. C08L 91/00
[52] U.S. Cl. ............................ 260/23.5 A; 260/23.7 R; 260/31.2 R; 260/33.4 R; 260/33.6 AQ; 260/33.6 PQ; 260/33.8 R
[58] Field of Search ................. 260/23.5 A, 23.7 R, 260/33.6 AQ, 33.6 PQ, 33.4 R, 31.2, 33.8 R, DIG. 31

[56] References Cited

U.S. PATENT DOCUMENTS

| | | |
|---|---|---|
| 3,836,511 | 9/1974 | O'Farrell et al. ............ 260/DIG. 31 |
| 3,847,854 | 11/1974 | Canter et al. ................. 260/23.7 M |
| 3,867,247 | 2/1975 | O'Farrell et al. ................... 260/33.4 |
| 4,072,648 | 2/1978 | O'Farrell et al. ............... 260/27 BB |

Primary Examiner—Lewis T. Jacobs
Attorney, Agent, or Firm—Richard E. Nanfeldt

[57] ABSTRACT

This invention relates to an improved process for the formation of an improved gel-free neutralized sulfonated elastomeric polymer having about 10 to about 50 meq. unneutralized sulfonate groups, wherein the unneutralized sulfonate groups are neutralized with a metal counterion being selected from the group including lithium, sodium, potassium, cesium, barium, calcium, magnesium, zinc, lead, iron (II), copper (II), mercury (II), and nickel. A cement of an elastomeric polymer having olefinic functional groups dissolved in a non-reactive solvent is contacted with a sulfonating agent such as an acyl sulfate thereby sulfonating the elastomeric polymer, and the sulfonation reaction is subsequently quenched by the addition of isopropanol at a concentration level of about 5 to about 30 volume percent based on a volume of the non-reactive solvent. The unneutralized sulfonated elastomeric polymer is then neutralized with a neutralizing agent dissolved in water, the water being at a concentration level of less than about 2.5 volume percent based on the volume of the non-reactive solvent thereby forming a gel-free cement of the neutralized sulfonated elastomeric polymer having a Brookfield viscosity at room temperature of less than about 20,000 cps.

24 Claims, No Drawings

//4,221,712//

PROCESS FOR FORMING A METAL SULFONATE CONTAINING EPDM

CROSS-REFERENCE TO RELATED APPLICATIONS

This application is a continuation-in-part of application Ser. No. 009,871, filed Feb. 7, 1979, now abandoned, which is a Rule 60 Continuation application of Ser. No. 855,762, filed Nov. 29, 1977, now abandoned.

FIELD OF THE INVENTION

This invention relates to an improved process for the formation of an improved gel-free neutralized sulfonated elastomeric polymer having about 10 to about 50 meq. unneutralized sulfonate groups, wherein the unneutralized sulfonate groups are neutralized with a metal counterion being selected from the group including lithium, sodium, potassium, cesium, barium, calcium, magnesium, zinc, lead, iron (II), copper (II), mercury (II), and nickel. A cement of an elastomeric polymer having olefinic functional groups dissolved in a non-reactive solvent is contacted with a sulfonating agent such as an acyl sulfate thereby sulfonating the elastomeric polymer, and the sulfonation reaction is subsequently quenched by the addition of isopropanol at a concentration level of about 5 to about 30 volume percent based on a volume of the non-reactive solvent. The unneutralized sulfonated elastomeric polymer is then neutralized with a neutralizing agent dissolved in water, the water being at a concentration level of less than about 2.5 volume percent based on the volume of the non-reactive solvent thereby forming a gel-free cement of the neutralized sulfonated elastomeric polymer having a Brookfield viscosity at room temperature of less than about 20,000 cps.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized on a two-roll mill with a basic material to form an ionically crosslinked elastomer at room temperature having substantially improved physical properties over an unsulfonated elastomer. These sulfonated elastomers may be processed somewhat like a conventional thermoplastic at elevated temperatures under a shear force in the presence of selected preferential plasticizers which dissipate the ionic associations at the elevated temperatures thereby creating a reprocessable elastomer. The basic materials used as neutralizing agents are selected from organic amines or basic materials selected from Groups I, II, III, IV, V, VI-B, VII-B and VIII and mixtures thereof of the Periodic Table of Elements.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers in solution are organic amines dissolved in an aliphatic alcohol. The resultant neutralized sulfonated elastomeric polymers prepared by this process exhibit somewhat inferior physical properties due to a rather low degree of ionic association.

U.S. Pat. Nos. 3,870,841 and 3,847,854, herein incorporated by reference, teach a method of plasticization of the polymeric backbone of a neutralized sulfonated polymer. The plasticizing agent is incorporated into the sulfonated polymer by hot melting the neutralized sulfonated polymer with the plasticizing agent. Although the rheological properties are improved, the incorporation of these plasticizing agents into the neutralized sulfonated polymers is extremely difficult and usually results in a general decrease in physical properties.

The four aforementioned patents teach the method of compounding the additives into the neutralized sulfonated elastomeric polymer under high heat and shear conditions or the use of an organic amine neutralizing agent thereby resulting in compositions either having poor rheological or physical properties.

The present invention teaches a new improved process for the formation of an improved gel free neutralized sulfonated elastomeric polymer having both excellent rheological and physical properties. The improvement comprises the inactivation of the sulfonation cement followed by the addition of select neutralizing agents dissolved in water at concentrations such that water is present at less than about 2.5 volume percent based on sulfonation solvent.

SUMMARY OF THE INVENTION

The complete process for the production of neutralized and plasticized sulfonated low unsaturation elastomers requires, after sulfonation, the effective neutralization of the sulfonated elastomer with ionic reagents to produce a cement which is gel free and low in viscosity. It has been found that such a process can be achieved when the sulfonation is quenched with isopropanol and the resultant cement is neutralized with an aqueous solution of select metal hydroxides, carbonates, or carboxylates, the water being at a concentration level of less than about 2.5 volume percent based on a volume of non-reactive sulfonation solvent. The resultant neutralized cements posses Brookfield viscosities of less than about 20,000 cps at room temperature at about 0.6 rpm. The neutralized sulfonated polymers derived from this process are essentially gel free and possess excellent physical and rheological properties.

GENERAL DESCRIPTION OF THE INVENTION

The present invention relates to a unique and novel improved process for the manufacture of a gel free neutralized sulfonated elastomeric polymer having both improved physical and rheological properties, by sulfonation of an unsaturated elastomer in a solution of a non-reactive solvent, inactivation of the sulfonation cement with isopropanol, the introduction of an ionic group plasticizer, and neutralization with a solution of a neutralizing agent dissolved in water to produce neutralized sulfonated cements with viscosities sufficiently low to be handled in manufacturing processes, wherein the concentration level of water is less than about 2.5 volume percent based on a volume of the non-reactive solvent.

The elastomeric polymers of the present invention are derived from elastomers having olefinic unsaturation sites wherein the polymer has from about 0.1 to about 10.0 mole percent olefinic unsaturation. The unsaturation sites can be in the polymer backbone, a pendant therefrom or cyclic except that aromatic polymers are excluded from this description. In particular, the unsaturated polymers of this present invention include low unsaturated polymers such as Butyl rubber or EPDM polymers. Additionally, other unsaturated polymers contemplated are: partially hydrogenated polyisoprenes, partially hydrogenated polybutadienes, isoprene-styrene copolymers, butadiene-styrene copolymers, or Neoprene.

Highly unsaturated elastomers other than Neoprene would be contemplated in this invention; however, high unsaturation hydrocarbon polymers, such as polybutadiene, gel with the reagents of this invention during sulfonation and useless products result. Gel free means that the sulfonated polymer contains less than about 5 wt. % gel, more preferably less than about 3, and most preferably less than about 1 as measured by stirring a given weight of polymer in a solvent comprised of 95 toluene-5-methanol at a concentration of 50 g./liter for 24 hours, allowing the mixture to settle, withdrawing a weighed sample of the supernatant solution and evaporating to dryness.

In the practice of this invention, the molecular weight of the elastomeric polymer and the concentration of the elastomeric polymer in the nonreactive sulfonation are very important. In order to have a viable process, the neutralized sulfonated cement at the end of the process must have sufficiently low viscosities so that the cement may be properly handled with pumping operations, cleaning operations, and the like. The major factors which contribute to the viscosity of the final neutralized sulfonated cement are the molecular weight of the base elastomeric polymer, the concentration of the elastomeric polymer in the non-reactive sulfonation cement, the relative amount of sulfonate groups incorporated into the elastomeric polymer, the polar solvent used in reducing ionic associations thereby reducing the viscosity of the neutralized cement, and the amount of water in the cement.

In order to have an economical process, it is necessary to sulfonate elastomeric polymer cements containing at least about 50 g. elastomeric polymer per liter of non-reactive solvent. This situation obtains because in a commercial manufacturing process, solvents must be recovered and recycled. The more solvent recycled per unit elastomeric polymer product, the more expensive the product. In the instant invention, the preferred elastomeric polymer concentration in non-reactive solvent is at least about 50 g./liter.

In addition, it is necessary that the elastomeric polymer cements be low in viscosity. Sulfonation of the polymer cement does not result in substantial viscosity increases; however, neutralization results in very large solution viscosity increases, or in the extreme gel, due to the ionic associations. Therefore, it is important to keep the starting cement viscosities low by using polymer concentrations as low as economically feasible. However, high polymer concentrations are still possible if the molecular weight or Mooney viscosities are low. It is important therefore in the practice of this invention to use elastomeric polymers with as low Mooney viscosities as possible.

It has been found that neutralized sulfonated polymers possess good physical properties even if the Mooney viscosity (ML, 1+8, 212° F.) of the starting polymer is about 5. On the other hand, at the high Mooney viscosities when cements containing 50 g. polymer/liter solvent are sulfonated and neutralized extremely high final cement viscosities are obtained. The process of this invention can be practiced when the elastomeric polymer cement at a concentration of 50 g. polymer/liter of non-reactive solvent possesses at 25° C. a Brookfield viscosity of 2500 centipoise (cps) or less. The Mooney viscosity (ML, 1+8, 212° F.) of the elastomeric polymer is preferably about 5 to about 60, more preferably about 10 to about 50, and most preferably about 15 to about 45.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0 and a Mooney viscosity (ML, 1+8, 212° F.) of about 45.

Very low molecular weight Butyl rubbers, i.e. Butyl rubbers having a viscosity average molecular weight of about 5,000 to 85,000 and a mole percent unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM-D-1418-64 and is intended to mean a terpolymer containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 45 to about 75 wt. % ethylene and about 1 to about 10 wt. % of a diene monomer, the balance of the polymer being propylene. Preferably, the polymer contains about 45 to about 70 wt. % ethylene, e.g. 50 wt. % and about 2.6 to about 8.0 wt. % diene monomer, e.g. 5.0 wt. %. The diene monomer is preferably a nonconjugated diene.

Illustrative of these nonconjugated diene monomers which may be used in the EPDM terpolymer (EPDM) are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity (ML, 1+8, 212° F.) of about 40 and having 50 wt. % of ethylene, 45 wt. % of propylene, and 5.0 wt. % of 5-ethylidene-2-norbornene with an $\overline{M}n$ of about 47,000, an $\overline{M}v$ of about 145,000 and an $\overline{M}w$ of about 174,000, as measured by gel permeation chromatography.

Another EPDM terpolymer, Vistalon 2504-20 is derived from Vistalon 2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000, as measured by gel permeation chromatography.

Nordel 1320 (DuPont) is another EPDM terpolymer having a Mooney viscosity at 212° F. of about 25 and having about 53 wt. % of ethylene, about 3.5 wt. % of 1,4-hexadiene, and about 43.5 wt. % of propylene.

In carrying out the present invention, the olefinically unsaturated polymer is dissolved in a suitable non-reactive solvent at a concentration level of about 2 to about 25 wt. %, more preferably at about 5 to about 20 wt. % and most preferably at about 10 to about 15 wt. %. Suitable solvents for sulfonation are selected from the group consisting of chlorinated aliphatic hydrocarbons such as 1,2-dichloroethane, halogenated aromatic hydrocarbons such as chlorobenzene, alicyclic hydrocarbons such as cyclohexane or aliphatic hydrocarbons having about 4 to about 7 carbon atoms, more preferably 5 to 6, such as isomeric pentanes and hexanes and mixtures thereof. In terms of an economical process halogenated solvents are less preferred as well as solvents boiling above about 80° C. Preferred solvents are hydrocarbons boiling at about or below 80° C. such as hexane and cyclohexane. The most preferred solvents are the saturated aliphatic hydrocarbons containing from 4 to 6 carbon atoms and mixtures thereof.

In carrying out the present invention, an olefinically unsaturated polymer dissolved in the solvent is sulfonated with a sulfonating agent selected from the group consisting of an acyl sulfate, and a sulfur trioxide donor complexed with a Lewis base containing oxygen, sulfur or phosphorous.

The term "sulfur trioxide donor" as used in the specification means a compound containing available sulfur trioxide. Illustrative of such sulfur trioxide donors are $SO_3$, chlorosulfonic acid, and fluorosulfonic acid. The term "complexing agent" as used in the specification means a Lewis base suitable for use in the practice of this invention, wherein Lewis base is an electron pair donor.

Illustrative of Lewis bases suitable for use as complexing agents are certain phosphorous compounds. While the phosphorous compound may be either inorganic or organic, it is preferred that the phosphorous compound be an organic compound. Various organic phosphites, phosphinites, phosphinates, phosphates, phosphonates, phosphonites and phosphines may be used as the complexing agent. The organic substituents consist of $C_1$ to $C_{10}$ alkyl, aryl, alkaryl, or aralkyl groups. The nitrogen containing Lewis bases form highly stable complexes with sulfur trioxide donors and are not considered suitable for sulfonation of the unsaturated polymers of this invention.

Other Lewis bases suitable as complexing agents are those Lewis bases which contain oxygen or sulfur. Ethers and thioethers have been found useful for complexing sulfur trioxide donor to moderate reaction with the unsaturation of polymer molecules. The ethers and thioethers may contain one, two or more ether oxygens or sulfurs and may be linear or cyclic. Illustrative of the ether Lewis bases suitable for use in the practice of this invention are tetrahydrofuran, paradioxane, 2,3-dichloro-1,4-dioxane, metadioxane, 2,4 dimethyl-1,3-dioxane, 2-phenyl-1,3-dioxane, diethyl ether trioxane and bis (2-chloroethyl)-ether. The preferred oxygen containing bases are p-dioxane, tetrahydrofuran and bis-(2-chloroethyl) ether. Illustrative of the thioethers are diethyl sulfide and tetrahydrothiophene.

Other oxygen containing Lewis bases suitable as complexing agents are carboxylic acid esters wherein the carboxylic acid is a $C_1$ to $C_{10}$ aliphatic acid, benzoic acid, or phenylacetic acid. Illustrative of such esters are benzyl acetate, butyl acetate, butyl propionate, methyl benzoate, p-nitrophenyl acetate, ethyl-n-butyrate, ethyl stearate, and ethyl phenyl acetate.

The molar ratio of $SO_3$ donor to complexing agent may be as high as 15 to 1; preferably less than about 9:1; more preferably about 4:1 to about 1:1; e.g. 2:1.

The preferred solvents for preparation of the complexes of sulfur trioxide donor with complexing agents containing oxygen or sulfur are chlorinated hydrocarbons. Illustrative of such chlorinated solvents are carbon tetrachloride, dichloroethane, chloroform, and methylene chloride. The complexes may also be prepared by direct addition of reagents, if precautions are taken to dissipate evolved heat.

The reactions of ethereal complexes of $SO_3$ with the unsaturation of polymer chains has been found to be nonquantitative. Therefore, the use of excess complex is required to give the desired level of sulfonation.

The preferred sulfonating agents of the instant invention are the acyl sulfates, in particular acetyl sulfate. The acyl sulfates which are selected from the group consisting of acetyl, propionyl, butyrl, and benzoyl sulfate, in particular acetyl sulfate. The acyl sulfate may be produced by reacting concentrated sulfuric acid with an acid anhydride. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternatively, sulfur trioxide may be reacted with acetic acid to form the acetyl sulfate.

The preferred sulfonated agent is acetyl sulfate which can be prepared according to the following equations:

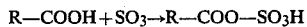

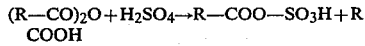

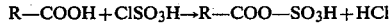

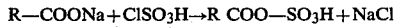

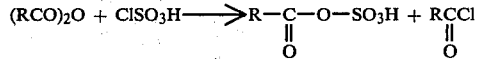

Sulfonation of the polymer is conducted at a temperature between $-40°$ C. and $+100°$ C., wherein the reaction time is about 1 to about 60 minutes, more preferably about 5 to about 45 minutes and most preferably about 15 to about 30 minutes.

The sulfonation of less substituted olefinic structures, such as derived from 1,4-hexadiene terpolymers requires somewhat higher temperatures, e.g. 50° C. when unsaturation levels are low, e.g. less than 2 mole %. More highly substituted olefinic structures, such as that derived from 5-ethylidene-2-norbornene, are rapidly sulfonated at room temperature and below even at low levels of unsaturation. The product remains soluble throughout the reaction. It should be pointed out that neither the sulfonating agent nor the manner of sulfonation is critical, provided that the sulfonating method does not degrade or cross-link the polymer backbone.

The amount of desirable sulfonation depends on the particular application. Preferably, the elastomeric polymer is sulfonated at about 10 to about 100 meq. sulfonate/100 grams of polymer, more preferably at about 10 to about 50 meq. sulfonate/100 grams of polymer, and most preferably at about 20 to about 40 meq. sulfonate/100 grams of polymer. The meq. of sulfonate/100 grams of polymer is determined by dissolving the unneutralized sulfonated polymer in a mixed solvent of 95 parts of toluene and 5 parts of methanol at a concentration level of 50 grams per liter of solvent. The unneutralized sulfonated polymer is titrated with sodium ethoxide to an Alizarin-Thymolphthalein end point. The sulfonate level can also be determined from sulfur content which is obtained by Dietert Analysis.

Polymers containing unsaturation and unneutralized sulfonate groups have been found to be somewhat deficient in thermostability. Therefore, it is desirable to neutralize a substantial portion of the sulfonate as part of the manufacturing of the sulfonated elastomeric polymer. Neutralization further improves the physical properties of the sulfonated polymer.

In preparing the ionomer it is desirable to neutralize essentially every sulfonate group. In the instant invention, neutralizing agent is added in sufficient excess to insure the neutralization of all sulfonate groups.

When the molecular weight of the elastomeric polymer or the concentration of the elastomeric polymer is high, gelation can occur due to the ionic interactions between the unneutralized sulfonate groups during sulfonation or between the metal sulfonate groups after neutralization. The ionic associations of the sulfonate groups are dissipated by ionic group plasticizers such as polar hydrocarbons.

Neutralization can be effected by the use of metallic salts of carboxylic acids, metallic carbonates or bicarbonates, or metallic hydroxides dissolved in water. However, extremely high cement viscosities or gels can develop due to the effects of the water added during neutralization thereby producing neutralized sulfonated elastomeric cements which cannot be stirred, pumped, poured or otherwise easily handled. Since it is necessary to convert the unneutralized sulfonate groups to the metal sulfonate, it is necessary to use metal containing neutralizing agents. It is further necessary that these neutralizing agents be soluble in a solvent, even if the solvent is not miscible with the sulfonation cement. Most of the metal neutralizing agents which might be suitable for this invention are not sufficiently soluble in any organic type solvent. The only effective, available, inexpensive and easy to handle solvent is water. As a consequence, the problem of high viscosity or gelation during the neutralization of sulfonation cements can only be overcome by lowering the amount of water present in the neutralization system. The only effective manner in which this can be done is to choose only those neutralization agents which have a sufficiently high degree of solubility in water.

Those neutralizing agents which are effective in neutralizing the polymer and in producing neutralized cements which can be processed are those which possess solubilities such that the weight of metal neutralizing agent which is equivalent to 200 milliequivalents of metal is soluble in 100 ml. of water or less at a temperature of from about 0° C. to about 100° C. There are four general classes of metal containing neutralizing agents which possess these solubility characteristics: hydroxides, carbonates, bicarbonates, and carboxylates. Some of these reagents are given in Table 1.

TABLE 1

SOLUBILITY OF METAL ACETATES, FORMATES, BENZOATES, HYDROXIDES, CARBONATES AND BICARBONATES

| Compound | Formula | Solubility g/100 ml $H_2O$ | Temp., °C. | Grams of Compound Equivalent to 200 meq. of Metal |
|---|---|---|---|---|
| Barium Acetate | $Ba(OOCCH_3)_2 \cdot H_2O$ | 76.4 | 26 | 27.3 |
| Calcium Acetate | $Ca(OOCCH_3)_2 \cdot 2H_2O$ | 43.6 | 0 | 17.6 |
| Cesium Acetate | $CsOOCCH_3$ | 945.1 | −2.5 | 38.4 |
| Lead Acetate | $Pb(OOCCH_3)_2 \cdot 3H_2O$ | 45.6 | 15 | 37.9 |
| Lithium Acetate | $LiOOCCH_3 \cdot 2H_2O$ | 300 | 15 | 20.4 |
| Magnesium Acetate | $Mg(OOCCH_3)_2 \cdot 4H_2O$ | 36.2 | 0 | 21.4 |
| Mercuric Acetate | $Hg(OOCCH_3)_2$ | 100 | 100 | 31.9 |
| Potassium Acetate | $KOOCCH_3$ | 286 | 31 | 19.6 |
| Sodium Acetate | $NaOOCCH_3 \cdot 3H_2O$ | 76 | 0 | 27.2 |
| Zinc Acetate | $Zn(OOCCH_3)_2 \cdot 2H_2O$ | 31 | 20 | 22.0 |
| Barium Formate | $Ba(OOCH)_2$ | 27.8 | 0 | 22.7 |
| Calcium Formate | $Ca(OOCH)_2$ | 16.2 | 0 | 13.0 |
| Cesium Formate | $CsOOCH$ | 2012 | 95.4 | 35.6 |
| Lead Formate | $Pb(OOCH)_2$ | 20 | 100 | 29.8 |
| Lithium Formate | $LiOOCH \cdot H_2O$ | 24.4 | 0 | 14.0 |
| Magnesium Formate | $Mg(OOCH)_2 \cdot 2H_2O$ | 7.7 | Cold | 15.0 |
| Potassium Formate | $KOOCH$ | 331 | 18 | 16.8 |
| Sodium Formate | $NaOOCH$ | 44 | 0 | 13.6 |
| Zinc Formate | $Zn(OOCH)_2 \cdot 2H_2O$ | 38 | 100 | 19.2 |
| Cesium Benzoate | $CsOOCC_6H_5$ | 294.5 | 0 | 50.8 |
| Magnesium Benzoate | $Mg(OOCC_6H_5)_2 \cdot 3H_2O$ | 19.6 | 100 | 32.0 |
| Potassium Benzoate | $KOOCC_6H_5 \cdot 3H_2O$ | 52 | 25 | 42.8 |
| Sodium Benzoate | $NaOOCC_6H_5$ | 66 | 20 | 28.8 |
| Barium Hydroxide | $Ba(OH)_2 \cdot 8H_2O$ | 94.7 | 78 | 31.6 |
| Cesium Hydroxide | $CsOH$ | 395.5 | 15 | 30.0 |
| Cesium Carbonate | $Cs_2CO_3$ | 260.5 | 15 | 32.6 |

TABLE 1-continued
SOLUBILITY OF METAL ACETATES, FORMATES, BENZOATES, HYDROXIDES, CARBONATES AND BICARBONATES

| Compound | Formula | Solubility g/100 ml H$_2$O | Temp., °C. | Grams of Compound Equivalent to 200 meq. of Metal |
|---|---|---|---|---|
| Cesium Bicarbonate | CsHCO$_3$ | 209.3 | 15 | 38.8 |
| Lithium Hydroxide | LiOH | 12.7 | 0 | 4.8 |
| Potassium Carbonate | K$_2$CO$_3$ . 2H$_2$O | 331 | 100 | 17.4 |
| Potassium Bicaronate | KHCO$_3$ | 60 | 60 | 20.0 |
| Potassium Hydroxide | KOH | 107 | 15 | 11.2 |
| Rubidium Carbonate | Rb$_2$CO$_3$ | 450 | 20 | 23.1 |
| Sodium Carbonate | Na$_2$CO$_3$ | 45.5 | 100 | 10.6 |
| Sodium Bicarbonate | NaHCO$_3$ | 16.4 | 60 | 16.8 |
| Sodium Hydroxide | NaOH | 42.0 | 0 | 8.0 |

Solubility data obtained from the "Handbook of Chemistry and Physics", 31st Edition.

For the hydroxides only, the alkali metal hydroxides and barium hydroxide fit the solubility criteria. For reasons of water solubility, cost and the ability of the cation to develop physical properties, sodium, potassium and barium hydroxides are the preferred hydroxides.

Similarly, only the alkali metal carbonates and bicarbonates fit the solubility criteria. For reasons of solubility, cost and the ability of the cation to develop physical properties, sodium and potassium carbonates are the preferred carbonates.

With the exception of barium, it is not possible to practice this invention with polyvalent hydroxides or carbonates. Only the carboxylates are generally useful. The carboxylate ion of the metallic salt is derived from the lower molecular weight aliphatic carboxylic acids, formic acid, acetic acid, propionic acid, and butyric acid, and from benzoic acid. Because of availability, good water solubility, low molecular weight, and ease of handling, the acetates are the preferred carboxylates. The metallic ion of the metallic salt of the carboxylic acid is selected from a non-limiting group consisting of lithium, sodium, potassium, cesium, barium, calcium, magnesium, zinc, lead, iron (II), copper (II), mercury (II) and nickel (II). The preferred cations are those derived from sodium, barium, magnesium, zinc and lead. A number of carboxylates fit the solubility criteria; however, these largely consist of the triacetates of the rare earth metals such as cerium, praseodymium, neodymium, samarium, gadolinium, and the like. These are less readily available and more expensive than the acetates of the metals listed above.

If the sulfonation cement at the end of the sulfonation is neutralized with an aqueous solution of the metallic neutralizing agent in the absence of a polar solvent severe gelation occurs. This gelation is not due to covalent cross-linking but due to the ionic associations between the metal sulfonated groups. This gelation is reversible through the addition of polar solvents which solvate the ionic groups and permit solubility. However, the ionic polymers of this invention contain only a relatively small amount of polar groups and are constituted mainly of hydrocarbon, i.e. the polymer chains themselves. Consequently, when polar solvents are added to the hydrocarbon cements of the sulfonated cements, precipitation of the polymer may occur if too much solvent is added or the solvent is highly polar or both. It is further desirable to use a polar solvent which possesses a high degree of solubility in both the non-reactive sulfonation solvent and water. An ideal polar solvent for these purposes is isopropanol.

The amount of isopropanol that can be used can vary from about 5 to about 30 volume percent based on the volume of the non-reactive solvent, more preferably about 5 to about 15 volume percent. At the higher isopropanol concentrations, the neutralized cement viscosities are the lowest and the most desirable; however, it is desirable to keep the isopropanol concentrations low in order to prevent polymer precipitation and to facilitate the separation of solvent from isopropanol after the solvent is evaporated from the polymer in the steam stripping operation.

The amount of water is kept at a minimum and is generally dictated not only by the solubility of the neutralizing agent but also the concentration of the polymeric species, the concentration of the unneutralized sulfonate groups and the desired ratio of metal ion to sulfonate groups in the neutralized cement. The ratio of meq. of metal ion to meq. of unneutralized sulfonate groups is maintained at between 1.5 and 4.0 for concentrations of unneutralized sulfonate groups less than 50 meq. per 100 grams of polymer. Water concentration of about 5 volume % or less based on the volume of the non-reactive solvent, more preferably less than about 2.5 volume %, is effective in preventing gelation and in producing cements with sufficiently low viscosities. The viscosities of the neutralized cements are considered processable, when the room temperature Brookfield viscosities do not exceed 20,000 centipoises (cps) at 0.6 rpm, more preferably about 1000 to about 10,000 cps.

The metal neutralized sulfonated elastomeric polymer prepared according to this present invention, can be isolated as a crumb by steam stripping. No surface active agents are needed to prepare the easy handling crumb. The crumb that is obtained is easily washed to remove water soluble impurities such as acetic acid and isopropanol and is suitable to be fed into a dewatering extruder or to be dried in a fluid bed dryer.

A preferential plasticizer can also be added to the neutralized sulfonated elastomer polymer in solution, wherein the plasticizer is selected from the group consisting of a carboxylic acid, esters of carboxylic acids, phenols, phosphates, amines and amides and mixtures thereof. The preferred plasticizer is a carboxylic acid. The carboxylic acid is a C$_8$ to C$_{30}$ aliphatic carboxylic acid, preferably C$_{12}$ to C$_{18}$, most preferably stearic acid. The preferential plasticizer is incorporated into the neutralized sulfonated polymer at less than about 25 parts per hundred by weight based on 100 parts of the neutralized sulfonated elastomeric polymer, more preferably at about 5 to about 25 and most preferably at about 9 to about 21. A typical plasticized sulfonated elastomeric compound of the instant invention includes a neutralized sulfonated elastomeric polymer consisting essentially of an elastomeric polymer having a Mooney viscosity at 212° F. of about 20 or less and having about 10 to about 100 meq. sulfonate groups per 100 grams of the elastomeric polymer, more preferably 28 to 35 meq.; about 30 to about 100 mmoles of a fatty acid per 100 parts of the elastomeric polymer; and about 60 to about 150 meq. of a metallic salt of an aliphatic acid per 100 parts of the elastomeric polymer, a cation of the metallic salt completely neutralizing the sulfonate groups.

DETAILED DESCRIPTION

The improved process of the present invention can be more readily appreciated by reference to the following examples and tables.

EXAMPLE 1

To a solution of 500 grams of Vistalon 2504 having a Mooney viscosity (ML, 1+8, 212° F.) of 40 in 5 liters of n-hexane and 28.7 ml. of acetic anhydride was added dropwise 10.52 ml. of concentrated $H_2SO_4$. The resultant cement was stirred for thirty minutes at room temperature and the reaction was quenched with 200 ml. of isopropanol containing 2.5 grams of Antioxidant 2246 (American Cyanamide). The cement was steam stripped, the polymer washed with water in a Waring blender and then the crumb was dewatered and banded on a rubber mill at 110° F. The isolated acid form of the sulfonated EPDM terpolymer was placed in vacuum ovens at 80° C. and 100° C. Samples were taken after 24 and 72 hours with the following results:

|  | Sulfur Content, wt. % |
|---|---|
| At 80° C. | |
| 24 hours | 1.00 |
| 72 hours | 0.92 |
| At 100° C. | |
| 24 hours | 0.78 |
| 72 hours | 0.64 |

This example shows a marked loss in sulfur content indicative of a substantial decomposition of the sulfonic acid groups within the polymer. The loss of sulfur is only a minimum indicator for polymer deterioration. Deterioration can also occur without substantial sulfur loss. This example shows that the acid form of the sulfonated EPDM terpolymer is thermally labile and that great care must be exercised in its handling.

EXAMPLE 2

Neat acetyl sulfate was prepared by cooling to −30° C. 76.3 ml. (0.81 mole) of acetic anhydride and then 28.0 ml. (0.5 mole) of concentrated sulfuric acid was added dropwise. The solution was permitted to warm to about 10° C. The molarity of this acetyl sulfate was 4.84. Three solutions of Vistalon 2504 having a Mooney viscosity (ML, 1+8, 212° F.) of 40 in n-heptane were prepared.

|  | Polymer, grams | Heptane, ml. | Cement Concentration wt. % |
|---|---|---|---|
| A | 100 | 2000 | 6.8 |
| B | 100 | 1670 | 8.1 |
| C | 100 | 1430 | 9.3 |

To each cement (A, B and C) was added 10.4 ml. of the 4.84 molar acetyl sulfate (50 mmoles). Samples A and B sulfonated smoothly without the formation of gel. The sulfonated cement of run C was vary thick after 30 minutes and turned into a tight gel on standing shortly thereafter. This gel could easily be broken through the addition of an isopropanol which demonstrates that the gel was formed through sulfonic acid group associations rather than through covalently bonded cross-linked sites. The formation of a gel is directly dependent upon the concentration of the EPDM terpolymer in the non-reactive solvent.

EXAMPLE 3

Fifty grams of Vistalon 2504 having a Mooney viscosity (ML, 1+8, 212° F.) of 40 was dissolved in 1000 ml. of n-heptane. To the cement at room temperature was added 5.2 ml. of 4.84 molar neat acetyl sulfate (25 mmoles). After 60 minutes, the fluid sulfonated cement was added to 1200 ml. of water in a baffled flask with good agitation. A gel quickly formed thereby illustrating the adverse effect of water on the acid form of the sulfonated EPDM terpolymer.

EXAMPLE 4

Two hundred grams of Vistalon 2504 having a Mooney viscosity (ML, 1+8, 212° F.) of 40 was dissolved in 4000 ml. of n-heptane. The amount was sulfonated with 16.8 ml. of 4.84 molar neat acetyl sulfate (81 mmoles). After 60 minutes, 1109 grams of the sulfonated cement was added to 2300 ml. of water containing 9.6 grams of $Mg(OOCCH_3).4H_2O$ (90 meq.) with good agitation in a baffled flask. A thick nonhomogeneous suspension of a gel in water resulted thereby showing that neutralization in the absence of a polar solvent with a neutralizing agent dissolved in water results in a gel.

EXAMPLE 5

Four solutions of Vistalon 2504 having a Mooney viscosity (ML, 1+8, 212° F.) of 20 was dissolved in n-heptane at various concentrations.

|  | Polymer, grams | n-heptane, ml. | Cement Concentration wt. % |
|---|---|---|---|
| A | 500 | 5555 | 11.6 |
| B | 500 | 5000 | 12.8 |
| C | 500 | 4545 | 13.4 |
| D | 500 | 4166 | 14.9 |

The cements were sulfonated by first adding 28.7 ml. of acetic anhydride (304 mmoles) followed by the slow addition of 10.52 ml. (187.5 mmoles) of concentrated sulfuric acid. After 30 minutes, 500 ml. of isopropanol was added. No gel occurred and the isopropanol quenched cements were very fluid. This example clearly demonstrates that lower molecular weight EPDM terpolymers can easily be sulfonated at cement concentrations of about 15 weight percent.

EXAMPLE 6

Five hundred grams of Vistalon 2504 having a Mooney viscosity (ML, 1+8, 212° F.) of 40 was dissolved in 10 liters of heptane. The cement was sulfonated with 42.0 ml. of 4.84 molar neat acetyl sulfate (250 mmole) at room temperature. After 30 minutes the reaction was quenched with 500 ml. of isopropanol which was 5 volume percent on heptane. To 1243 grams of the cement (equivalent to 100 grams of starting polymer) was added 40 ml. of 1 molar magnesium acetate in water (80 meq. magnesium in 31.4 ml. of water or 3.1 volume percent of heptane). The neutralized cement was thick but stirrable. The addition of 200 ml. (2 volume percent) of isopropanol to the neutralized cement resulted in a marked reduction in viscosity. The addition of another 60 ml. (6 volume percent) of isopropanol resulted in a very fluid system. As little as 5 volume percent of isopropanol produced a fluid system. A relatively substantial amount of water, certainly more than is required to dissolve the magnesium acetate, can be handled through the use of sufficient amounts of isopropanol.

EXAMPLE 7

Run A

Five hundred grams of Vistalon 2504 having a Mooney viscosity (ML, 1+8, 212° F.) of 20 was dissolved in 5000 ml. of n-heptane. The cement was sulfonated at room temperature by first adding 28.7 ml. (304 mmoles) of acetic anhydride and then slowly adding 10.52 ml. (187.7 mmoles $H_2SO_4$) of concentrated sulfuric acid. The reaction was quenched after thirty minutes with 250 ml. of isopropanol. Then 128 grams (450 mmoles) of stearic acid was added and stirring was continued. A solution of 49.4 grams (450 meq.) of $Zn(OOCCH_3)_2 \cdot 2H_2O$ in 125 ml. of $H_2O$ was added to the cement. The cement became very thick and a gel formed. Then 250 ml. of isopropanol was added and the gel was broken. The addition of another 250 ml. of isopropanol further reduced the viscosity. This run showed that with 2.5 volume percent of water on heptane that neutralized cements can be handled through the use of about 10 volume percent of isopropanol. Fluid cements are obtained at 15 volume percent of isopropanol.

Run B

Five hundred grams of Vistalon 2504 having a Mooney viscosity (ML, 1+8, 212° F.) of 20 was dissolved in 5000 ml. of n-heptane. The cement was sulfonated at room temperature by first adding 28.7 ml. (304 mmoles) of acetic anhydride and then slowly adding 10.52 ml. (187.7 mmoles) of concentrated sulfuric acid. After stirring the cement for 30 minutes, the reaction was quenched with 250 ml. of isopropanol. Then 128 grams (450 mmoles) of stearic acid was added. A solution of 450 meq. of zinc acetate in 250 ml. of water (5.0 volume percent on n-heptane) was used to neutralize the acid form of the polymer which resulted in a very thick cement. The addition of 250 ml. of isopropanol still resulted in a very thick cement. The addition of another 500 ml. of isopropanol resulted in a cement that could be easily stirred and poured. This run shows that a mixed solvent system of 5 volume percent water and 20 volume percent isopropanol can be used.

Run C

Another run was made which was identical to the procedures of Runs A and B. The cement was neutralized with 450 mmoles of zinc acetate in 375 ml. of water (7.5 volume percent on n-heptane) followed quickly by 250 ml. isopropanol. A bad gel resulted. However, the addition of another 750 ml. of isopropanol broke up the gel and resulted in a cement which could be stirred and poured. This example shows that a mixed solvent system of 7.5 volume percent of water and 25 volume percent of isopropanol can be used.

EXAMPLE 8

Five hundred grams of Vistalon 2504 having a Mooney viscosity (ML, 1+8, 212° F.) of 20 was dissolved in 5000 ml. of n-heptane. The Brookfield viscosity of a sample of this cement was measured. The cement was sulfonated by the addition of 28.7 ml. (304 mmoles) of acetic anhydride followed by the slow addition of 10.52 ml. (187.5 mmoles) of concentrated sulfuric acid. The cement was stirred for 30 minutes at room temperature, and the sulfonation was inactivated with the addition of 750 ml. of isopropanol. A sample of the inactivated cement was taken for Brookfield viscosity measurement.

A solution of 49.6 g. (450 meq.) of $Zn(OOCCH_3)_2 \cdot 2H_2O$ in 125 ml. of water was prepared and added to the cement. The cement thickened, but it could be stirred and handled easily.

The Brookfield viscosities (at 25° C.) of the cements were as follows:

| Cement | Brookfield Viscosity cps | rpm |
|---|---|---|
| Starting Vistalon Cement | 520 | 30 |
| Inactivated Sulfonation Cement | 390 | 30 |
| Neutralized Cement | 4050 | 60 |

These viscosity data show that substantial viscosity increases are obtained in the neutralization of the sulfonic acid; however, the viscosities are easily tolerated and are well within easy handling capabilities of pumps.

EXAMPLE 9

One hundred grams of 20 Mooney (ML, 1+8, 212° F.) Vistalon 2504 was dissolved in 1000 ml. Exxon hexane. To the solution was added at room temperature 5.74 ml. acetic anhydride (60.75 mmoles) and 2.10 ml. (37.5 mmoles of $H_2SO_4$) of concentrated sulfuric acid. The cement was stirred at room temperature for 30 minutes, and then the sulfonation reaction was terminated through the addition of isopropanol. A sample of acid cement was isolated for sulfur analysis. Then 90 mmoles of stearic acid was added, and stirring was continued until solution occurred. Aqueous solutions of $Zn(OOCCH_3)_2 \cdot 2H_2O$ were prepared—60 meq. of zinc in 17 ml. water and 90 meq. of zinc in 25 ml. water. The zinc acetate solutions were added, and stirring was continued for 30 minutes. The Brookfield viscosities of the cements were measured. The zinc neutralized polymer was isolated through steam stripping. The Brookfield viscosities, sulfonate contents and zinc contents are given in Table 2. This example demonstrates the use of stearic acid plasticizer as well as a range of water, isopropanol and zinc acetate concentrations in producing easy to handle cements and neutralized and plasticized sulfonated EPDM gums.

TABLE 2

| | | | Added to Cement, meq.* | | Brookfield Viscosity, CPS | | Contained Polymer* | |
|---|---|---|---|---|---|---|---|---|
| | Isopropanol, Ml. | $H_2O$, Ml. | Stearic Acid | Zinc Acetate | 0.6 rpm | 30 rpm | $-SO_3M$ | Zinc |
| A | 150 | 25 | 90 | 90 | 4000 | 1910 | 35.0 | 59.1 |

TABLE 2-continued

| | Isopropanol, Ml. | H₂O, Ml. | Added to Cement, meq.* | | Brookfield Viscosity, CPS | | Contained Polymer* | |
|---|---|---|---|---|---|---|---|---|
| | | | Stearic Acid | Zinc Acetate | 0.6 rpm | 30 rpm | —SO₃M | Zinc |
| B | 80 | 25 | 90 | 90 | 9600 | — | 33.9 | 78.3 |
| C | 150 | 17 | 90 | 60 | 1600 | 880 | 34.4 | 41.4 |
| D | 80 | 17 | 90 | 60 | 6000 | 3030 | 33.6 | 51.9 |

*Per 100 g of starting polymer.

EXAMPLE 10

In a series of three runs 500 g of 20 Mooney (ML, 1+8, 212° F.) Vistalon 2504 was dissolved in 5000 ml. Exxon hexane. To the solution was added at room temperature 28.7 ml. (303.75 mmoles) of acetic anhydride followed by 10.52 ml. (187.5 mmoles $H_2SO_4$) of concentrated sulfuric acid. The cement was stirred for 30 minutes, and the sulfonation was inactivated with 750 ml. isopropanol. Samples were taken for sulfur analysis. Aqueous solutions of $Zn(OOCCH_3)_2 \cdot 2H_2O$, $Mg(OOCCH_3)_2 \cdot 4H_2O$ and $Ba(OOCCH_3)_2$ were prepared by dissolving 450 milliequivalents in 125 ml. of water. These aqueous solutions were added to the inactivated cements. Viscosities increased in all cases, but the cements could be readily handled. Antioxidant 2246 (2.5 g) was added to the cement. The cements were steam stripped, the isolated polymers washed with water in a Waring blender, and the wet polymer crumb dewatered and dried on a rubber mill. The sulfur and metal contents are given in Table 3. This example illustrates the preparation of unplasticized Zn, Mg and Ba salts with about 30 meq. of sulfonate/100 g polymer.

TABLE 3

| Example | Meq. Sulfonate 100g Polymer | Metal Content | | Meq./ 100g Polymer |
|---|---|---|---|---|
| | | Counterion | Weight % | |
| 10A | 31.3 | Zn | 1.72 | 52.6 |
| 10B | 33.6 | Mg | 0.78 | 64.1 |
| 10C | 32.0 | Ba | 3.55 | 51.7 |
| 11A | 22.0 | Zn | 1.37 | 41.9 |
| 11B | 21.7 | Mg | 0.55 | 45.2 |
| 11C | 21.9 | Ba | 2.42 | 35.2 |
| 12A | 41.6 | Zn | 1.97 | 60.2 |
| 12B | 41.7 | Mg | 0.70 | 57.6 |
| 12C | 41.1 | Ba | 4.03 | 58.7 |

EXAMPLE 11

Another series of 3 runs was carried out as in Example 10; however, only 19.1 ml. of acetic anhydride (202 mmoles) and 7.0 ml. (126.5 mmoles $H_2SO_4$) of concentrated sulfuric acid were used. Neutralization was effected with 300 meq. of zinc, magnesium and barium acetates in 85 ml. water. All cements could be handled readily. After stabilization with Antioxidant 2246, the neutralized polymers were isolated as described in Example 1. Analytical data are given in Table 3. This example illustrates the preparation of unplasticized Zn, Mg and Ba salts with about 20 meq. of sulfonate/100 g polymer.

EXAMPLE 12

Another series of three runs was carried out as in Example 10 except that 38.2 ml. of acetic anhydride (404 mmoles) and 14.0 ml. (253 mmoles $H_2SO_4$) of concentrated sulfuric acid were used. Neutralization was effected with 600 meq. of the zinc, magnesium and barium acetates in 165 ml. of water. All cements could be stirred and readily handled. After stabilization with Antioxidant 2246, the neutralized polymers were isolated as described in Example 10. Analytical data are given in Table 3. This example illustrates the preparation of unplasticized Zn, Mg and Ba salts with about 40 meq. of sulfonate/100 g polymer.

EXAMPLE 13

The three runs in Example 10 were repeated exactly except that after the addition of isopropanol and before neutralization with the acetates of zinc, magnesium and barium 128 g (450 mmoles) of stearic acid was added to the inactivated cement. The resultant cements could be stirred and readily handled. Analytical data on these samples are given in Table 4.

TABLE 4

| Example | Meq. Sulfonate 100g Polymer | Stearic Acid Mmoles/100g Polymer | Metal Content | |
|---|---|---|---|---|
| | | | Counterion | Weight % |
| 13A | 31.9 | 90 | Zn | 1.35 |
| 13B | 31.6 | 90 | Mg | 0.47 |
| 13C | 32.8 | 90 | Ba | 2.73 |
| 14A | 21.4 | 60 | Zn | 0.84 |
| 14B | 20.5 | 60 | Mg | 0.35 |
| 14C | 21.3 | 60 | Ba | 1.96 |
| 15A | 39.7 | 120 | Zn | 1.56 |
| 15B | 40.6 | 120 | Mg | 0.47 |
| 15C | 38.4 | 120 | Ba | 3.04 |

EXAMPLE 14

The three runs in Example 11 were repeated exactly except that after the isopropanol inactivation of the cement and before neutralization with the zinc, magnesium and barium acetates 85.5 g of stearic acid (300 mmoles) was added. The resultant cements could be stirred and readily handled. Analytical data on these samples are given in Table 4.

EXAMPLE 15

The three runs in Example 12 were repeated exactly except that after isopropanol inactivation and before neutralization with the zinc, magnesium and barium salts 170.6 g of stearic acid (600 mmoles) was added. The resultant cements could be stirred and readily handled. Analytical data on these samples are given in Table 4. This example and Examples 13 and 14 illustrate the preparation of stearic acid plasticized gums of the Zn, Mg and Ba salts of sulfonate levels of about 20, 30 and 40 meq. sulfonate/100 g polymer.

EXAMPLE 16

A series of sulfonations and neutralizations was effected in this Example. The variables were (1) amount of isopropanol added to the cement, (2) the amount of water used to dissolve the metal acetate and then added to the cement, (3) metal counterion, i.e., zinc and magnesium, (4) type of carboxylic acid plasticizer (if any) added and (5) concentration of carboxylic acid added.

The runs were made at the 200 g or the 500 g (starting polymer) level according to the following ratios: 100 g of 20 Mooney (ML, 1+8, 212° F.) Vistalon 2504 was dissolved in 1000 ml. Exxon hexane. To the solution was added at room temperature 5.74 ml. acetic anhydride (60.75 mmoles) and 2.10 ml. (37.5 mmoles $H_2SO_4$) of concentrated sulfuric acid. The cement was stirred at room temperature for 30 minutes and the sulfonation was terminated through the addition of 7.5 or 15.0 volume percent isopropanol (on hexane solvent). Small samples of cement were taken for sulfur analysis. In the instances where no ionic domain plasticizer was desired, the cement was neutralized as described below. Otherwise, plasticizer (either lauric acid or stearic acid) was added to the cement at levels of 60, 75 and 90 mmoles per 100 g of starting polymer. Stirring was continued until all of the carboxylic acid plasticizer had been dissolved. Aqueous solution of $Zn(OOCCH_3)_2 \cdot 2H_2O$ and $Mg(OOCCH_3)_2 \cdot 4H_2O$ were dissolved in 1.65, 2.1 and 2.5 volume percent water (on hexane solvent). These solutions were added to the sulfonated cements with good agitation. Viscosity increases were obtained in all cases. Samples of the resultant cements were taken, and Brookfield viscosities were determined over a range of shear rates at room temperature. The remaining cement was steam stripped, the resultant polymer washed and pulverized in a Waring blender, and the resultant wet crumb was dewatered and dried on a rubber mill. Analytical and viscosity data are given in Table 5.

TABLE 5

| Run | Meq. Sulfonote 100g Polymer[a] | Mmoles of Carboxylic Acid Added[b] Stearic | Mmoles of Carboxylic Acid Added[b] Lauric | Milliequivalents Metal Acetate Added[b] Zinc | Milliequivalents Metal Acetate Added[b] Magnesium | Volume % $H_2O$ | Brookfield Viscosity, cps 7.5 Vol. % Isopropanol 0.6 rpm | Brookfield Viscosity, cps 7.5 Vol. % Isopropanol 30 rpm | Brookfield Viscosity, cps 15.0 Vol. % Isopropanol 0.6 rpm | Brookfield Viscosity, cps 15.0 Vol. % Isopropanol 30 rpm | Zinc Content Wt. %[d] | Meq./ 100g Polymer |
|---|---|---|---|---|---|---|---|---|---|---|---|---|
| A | 34.8 | — | — | 60 | — | 1.65 | 8,100 | 2240 | 5000 | 940 | 1.52 | 48.6 |
| B | 32.5 | — | — | 90 | — | 2.5 | 10,500 | 3740 | 1200 | 1165 | 1.84 | 59.1 |
| J | 34.4 | 30 | — | 60 | — | 1.65 | — | — | 3350 | 780 | 1.38 | 47.7 |
| O | 34.3 | 45 | — | 60 | — | 1.65 | — | — | 2510 | 720 | 1.17 | 42.0 |
| M | 34.8 | 60 | — | 60 | — | 1.65 | — | — | 4550 | 810 | 1.18 | 44.1 |
| C | 32.0 | 75 | — | 75 | — | 2.1 | — | 3125 | 6400 | 2680 | 1.36 | 52.5 |
| K | 32.3 | 90 | — | 90 | — | 2.5 | — | — | 9800 | 2930 | 1.46 | 58.5 |
| G | 35.0 | 75 | — | 90 | — | 2.5 | — | 1640 | 5200 | 930 | 1.64 | 63.6 |
| H | 34.2 | 60 | — | 90 | — | 2.5 | — | 5570 | 6000 | 600 | 1.72 | 64.5 |
| I | 33.8 | 45 | — | 90 | — | 2.5 | — | 4900 | 3200 | 830 | 1.75 | 63.0 |
| D | 31.9 | — | 60 | 60 | — | 1.65 | — | 1640 | 4600 | 930 | 1.08 | 38.4 |
| E | — | — | 75 | 75 | — | 2.1 | — | 5570 | 2300 | 600 | 1.20 | 43.5 |
| F | 33.8 | — | 90 | 90 | — | 2.5 | — | 4900 | 6200 | 880 | 1.44 | 54.0 |
| P | 35.3 | 45 | — | — | 60 | 1.65 | — | — | 2150 | 700 | 0.44[e] | 42.3 |
| N | 34.8 | 60 | — | — | 60 | 1.65 | — | — | 2900 | 620 | 0.43[e] | 42.6 |
| L | 33.0 | 90 | — | — | 90 | 2.5 | — | — | 4475 | 740 | 0.44[e] | 46.5 |

[a] Dietert sulfur analysis
[b] Per 100g of starting polymer
[c] Based on hexane
[d] From 15.0 volume percent isopropanol runs
[e] Magnesium Molded pads of the gums were obtained at 350° F. Stress-stain properties were determined at room temperature and 70° C. Flow properties were measured with an Instron Capillary Rheometer at 200° C. The mechanical and rheological property data are given in Table 6. The data in this example show that a wide variety of thermoelastic systems differing in mechanical properties and in flow properties can be prepared according to the process of this invention by changing the neutralizing agent and its concentration and by changing the carboxylic acid plasticizer and its concentration. This example further demonstrates the effective use of 7.5 volume percent isopropanol as well as 15 volume percent isopropanol. Even at the low levels of water used in this example, it is apparent that an increase in water concentration increases the Brookfield viscosities of the cements.

TABLE 6

| | Room Temperature | | | Capillary Rheometry | | | |
|---|---|---|---|---|---|---|---|
| | 300% | Tensile | | Shear Stress, dynes/$cm^2$ × $10^{-5}$ | | | Melt Fracture |
| Run | Modulus, psi | Strength, psi | Elongation, % | 0.88 $sec^{-1}$ | 88 $sec^{-1}$ | 440 $sec^{-1}$ | Shear Rate, $sec^{-1}$ |
| A | 610 | 1375 | 480 | 41.4 | 81.9 | 99.1 | 0.88 |
| B | 545 | 1220 | 480 | 32.0 | 76.5 | 95.2 | 8.8 |
| J | 480 | 1320 | 560 | 6.8 | 39.9 | 59.7 | 440 |
| O | 490 | 1460 | 540 | 6.2 | 38.6 | 58.9 | 88 |
| M | 490 | 1230 | 510 | 2.8 | 22.6 | 36.7 | 440 |
| C | 430 | 1890 | 630 | 2.8 | 23.8 | 37.8 | >1469 |
| K | 450 | 1795 | 620 | 1.7 | 19.3 | 32.8 | >1469 |
| G | 490 | 1860 | 580 | 3.3 | 26.4 | 42.1 | 1469 |
| H | 535 | 2005 | 580 | 5.1 | 33.4 | 51.9 | 1469 |
| I | 470 | 1430 | 570 | 8.0 | 43.9 | 64.0 | 294 |
| D | 430 | 1890 | 630 | 2.1 | 21.5 | 38.6 | 8.8 |
| E | 210 | 680 | 630 | 2.7 | 21.1 | 38.2 | 88 |
| F | 210 | 600 | 600 | 3.2 | 27.0 | 42.9 | 1469 |
| P | 550 | 1520 | 515 | 24.0 | 64.8 | 84.3 | 8.8 |
| M | 565 | 1810 | 530 | 19.7 | 60.1 | 76.5 | 8.8 |
| L | 640 | 1750 | 515 | 7.3 | 38.9 | 55.4 | 294 |

EXAMPLE 17

A 1500-gallon glass lined reactor was charged with 4880 pounds (866 gallons) of Exxon hexane and then 680.4 pounds of 20 Mooney (ML, 1+8, 221° F.) Vistalon 2504. After solution had occurred, 19.18 kg. (17.76 pounds) of acetic anhydride was charged in. Then with the temperature at about 23°-24° C., 11.95 kg. (26.4 pounds) of concentrated sulfuric acid was added slowly. The cement was stirred for 30 minutes, and then 80 pounds (122 gallons) of isopropanol was added. Samples were isolated and worked up for sulfur analysis. Analysis showed the sulfonated polymer to contain 31.9 meq. of sulfonic acid per 100 g of polymer. Then 174.2 pounds of stearic acid was charged in, and the cement was stirred until the stearic acid was all dissolved. A solution of 30.5 kg. (67.4 pounds) of $Zn(OOCCH_3)_2 \cdot 2H_2O$ was dissolved in 77.3 kg. (170.4 pounds) of water in a 55 gallon stainless steel drum. The aqueous solution was added to the deactivated cement. The resultant neutralized cement stirred very readily under the conditions and produced a very homogeneous cement. Antioxidant 2246 (3.4 pounds) was stirred in. The cement was transferred to a 55 gallon stainless steel drum by gravity feed. The kettle emptied easily, and the draining from the walls was excellent. Rinsing the walls down with toluene-methanol cleaning solutions produced a clean kettle. The drums were fitted with a Graco Monark 5:1 ratio pump (Model 206-393) which possesses a maximum pump delivery with continuous duty of 2.5 gallons/minute. The neutralized cement was steam stripped at the rate of 50-70 gallons/hour by pumping the neutralized cement into a continuous steam stripper whose main drum was 200 gallons in size. By suitable adjustment of the feed rate, agitation, hold-up time and hot water temperature (about 85° C.) an easily handled, non-sticking crumb could be collected. The wet crumb produced in the stripping operation contained about 60 weight percent water. The crumb was fed to a dewatering extruder with an Acrison Inc. Model 105 double augur screw feeder having a 2 cubic foot hopper. The dewatering extruder was a 1.5 inch Welding Engineers dewatering extruder equipped with a single adjustable orifice die-plate. It was steam heated at 100 psig (675 kPa) of steam. The temperature of the steam was about 175° C. The die-plate was electrically heated at 157° C. The material emerged as a blown strand containing about 1 weight percent moisture. The material prepared in this way could be very easily mixed with extender oils, mineral fillers, carbon blacks and other additives on rubber mills, and large and small Banbury. The formulations could be injected molded and extruded into end products such as sneakers, garden hose, etc.

The improved process, as embodied in the aforementioned examples, for the preparation of a neutralized sulfonated elastomeric polymer clearly defines a means for producing gel-free cements having viscosities below 20,000 centipoises at 0.6 rpm at room temperature which are easily stirrable and pourable.

Since many modifications and variations of the process of this invention may be made without departing from the spirit and scope of the invention thereof, it is not intended to limit the scope or spirit thereof to the specific examples thereof.

What is claimed is:

1. A process for preparing a gel-free cement of a neutralized sulfonated polymer, said cement having a Brookfield viscosity at 0.6 rpm at room temperature of less than about 20,000 cps which comprises:

(a) quenching a solution of an unneutralized sulfonated polymer dissolved in a nonreactive solvent with isopropanol, said unneutralized sulfonated polymer having about 10 to about 50 meq. of unneutralized sulfonate groups/100 grams of polymer, and said isopropanol added to a concentration level of about 5 to about 30 volume percent based on a volume of said nonreactive solvent; and (b) neutralizing said unneutralized sulfonated polymer dissolved in said nonreactive solvent and said isopropanol with a neutralizing agent dissolved in water, said water at a concentration level of less than about 2.5 volume percent based on said volume of said nonreactive solvent to form said gel-free cement of said neutralized sulfonated polymer.

2. The process according to claim 1 further comprising the addition of a plasticizer to said gel-free cement of said sulfonated polymer at a concentration level of at least about 3 parts by weight based on 100 parts by weight of said neutralized sulfonated polymer.

3. The process according to claim 1, wherein said nonreactive solvent is selected from the group consisting of aromatic hydrocarbons, aliphatic hydrocarbons and chlorinated aliphatic hydrocarbons and mixtures thereof.

4. The process according to claim 1, wherein said nonreactive solvent is an aliphatic hydrocarbon.

5. The process according to claim 2, wherein said plasticizer is a carboxylic acid.

6. A process according to claim 5, wherein said carboxylic acid has about 10 to about 30 carbon atoms.

7. A process according to claim 1, wherein at least about 200 milliequivalents of said neutralizing agent is soluble in 100 ml. of water at a temperature of about 0° C. to about 100° C.

8. A process according to claim 1, wherein said neutralizing agent is selected from the group consisting of an alkali metal hydroxide and barium hydroxide.

9. A process according to claim 1, wherein said neutralizing agent is an alkali metal carbonate or bicarbonate.

10. A process according to claim 1, wherein said neutralizing agent is a metallic salt of a carboxylic acid.

11. The process according to claim 10, wherein such carboxylic acid is selected from the group consisting of acetic acid, benzoic acid and formic acid and mixtures thereof.

12. The process according to claim 10, wherein a metal ion of said metallic salt is selected from the group consisting of lithium, sodium, potassium, cesium, barium, calcium, magnesium, zinc, lead, iron (II), copper (II), mercury (II) and nickel (II).

13. The process according to claim 1 wherein said neutralized sulfonated polymer is removed from said gel-free cement by steam stripping.

14. The process according to claim 1 wherein said sulfonated polymer is formed from a hydrocarbon elastomeric polymer.

15. The process according to claim 13, wherein said hydrocarbon elastomeric polymer is selected from the group consisting of Butyl rubbers, partially hydrogenated polyisoprenes, partially hydrogenated polybutadienes, styrenebutadiene copolymers, isoprene-styrene copolymers, EPDM terpolymers, and neoprene and mixtures thereof.

16. The process according to claim 15 wherein such EPDM terpolymer consists essentially of about 40 to about 65 wt. % of ethylene, of about 10 to about 53 wt. % of propylene, and of about 2 to about 10 wt. % of a nonconjugated diene.

17. A process according to claim 16, wherein said nonconjugated diene is selected from the group consisting of 1,4-hexadiene, dicyclopentadiene, alkylidene substituted norbornenes, alkenyl substituted norbornenes, tetrahydroindene, and alkyl substituted tetrahydroindenes.

18. A process according to claim 16, wherein said nonconjugated diene is 5-ethylidene-2-norbornene.

19. A neutralized sulfonated elastomeric composition consisting essentially of the reaction product of:
(a) an elastomeric polymer having a Mooney viscosity at 212° F. of about 20 or less and having about 10 to about 100 meq. sulfonate groups per 100 grams of said elastomeric polymer;
(b) about 0.25 to about 3.0 mmole of an aliphatic carboxylic acid per milliequivalent of sulfonate group of said elastomeric polymer, said carboxylic acid having about 8 to about 30 carbon atoms; and
(c) about 1.5 to about 4.0 milliequivalent of a metallic salt of an aliphatic acid per milliequivalent of sulfonate group of said elastomeric, said aliphatic acid being selected from the group consisting of acetic, formic, propionic, butyric and benzoic, a metal cation of said metallic salt being selected from the group consisting of barium, calcium, cesium, lead, iron (II), copper (II), lithium, magnesium, nickel (II), potassium, mercury (II), sodium, and zinc of the Periodic Table of Elements, said cations substantially neutralizing said sulfonate groups.

20. A composition according to claim 19, wherein said elastomeric polymer is selected from the group consisting of Butyl rubber and an EPDM terpolymer.

21. A composition according to claim 20, wherein said fatty acid is stearic acid.

22. A composition according to claim 21, wherein said metallic salt is zinc acetate.

23. A composition according to claim 22, wherein a concentration of said stearic acid is about 2 to about 3 mmoles per milliequivalent of sulfonate group of said elastomeric polymer.

24. A composition according to claim 23, wherein a concentration of said zinc acetate is about 1.6 meq. to about 3.2 mmeq. per milliequivalent of sulfonate group of said elastomeric polymer.

* * * * *